UNITED STATES PATENT OFFICE.

SIMON LOESER AND ISIDOR LOESER, OF TRIER, PRUSSIA.

IMPROVEMENT IN METHODS OF DESTROYING INSECTS.

Specification forming part of Letters Patent No. 179,929, dated July 18, 1876; application filed January 18, 1876.

*To all whom it may concern:*

Be it known that we, SIMON LOESER and ISIDOR LOESER, both of the city of Trier, Kingdom of Prussia, German Empire, have invented certain Improvements in the Mode of Destroying Insects and Vermin, by means of gases, of which the following is a specification:

It is easy to understand that compact, pulverized, or liquid remedies are not capable of fully exterminating all manner of vermin, from the fact that such remedies lack the essential quality of being capable of penetrating into all places where the vermin may have concealed themselves. On the other hand, it is manifest that a suitable gas, which can be made to penetrate into all cracks and crevices, and even into the very pores, may carry with it death to all species of vermin in existence.

The nature of our invention consists in the employment of such a gas, and in the combination of certain elements for its production.

Sulphurous-acid gas is an effective agent for the destruction of vermin; but for this purpose it needs to be quickly produced at the highest possible temperature, the ordinary process of production by the simple combustion of sulphur being so slow that vermin will escape from it during its generation in a closed apartment. To obtain, therefore, a speedy generation of the gas we combine with the sulphur one-fifth part, in bulk, of commercial niter. The sulphur and niter are pulverized and well admixed, and the compound is ignited for use.

In the process of combustion the niter throws off its oxygen, whereby the compound is made to burn very rapidly, producing speedily large volumes of sulphurous-acid gas at a high temperature, and at a pressure, if the apartment be carefully closed, of not less than two and one-half atmospheres, and which will exert, consequently, a correspondingly great power of displacement and penetration.

We place the mixture of pulverized sulphur and niter (together with a third element, to which we shall hereafter refer) in a box of strong sheet-iron, and place the box upon a suitable metallic base within the room to be fumigated, and then ignite the mixture. To the fumes or gases arising from the combustion of sulphur and niter we add the fumes of distilled indigo as an accompanying and important element.

Indigo produces, by dry distillation, an intensely disgusting smell, which is noxious to all kinds of vermin, especially bed-bugs, and which serves to drive them out of their hiding-places.

To obtain its fumes we paint the sheet-iron box therewith, laying it on in a very thick coat, so that it shall undergo complete distillation when the box becomes heated.

Although the two elements, sulphur and niter, suffice, when combined and consumed as set forth, for the destruction of every species of living vermin, they are insufficient to destroy the vitality of the eggs of bugs. Hence we add to our composition a third element, which will produce this last effect, viz., finely-ground iodine, admixing it thoroughly with the pulverized sulphur and niter, in the proportion of one-fifth, in bulk, more or less, so that it shall be evaporated by their combustion.

The sulphurous-acid gas, which, when evolved by the combustion of the composition, quickly fills all spaces and penetrates every pore, carries with it the iodine vapors into every crevice, and the contact of the smallest atom of iodine with the egg of a bug is sufficient to corrode the outer integument thereof, and thereby render its development impossible.

In carrying out the process, the escape of gases and vapors must, as a matter of course, be, as far as possible, prevented, by carefully closing the rooms to be fumigated.

For complete effect, the gases should remain in contact for five hours, whereupon success in exterminating all manner of vermin within the apartment will be certain and radical.

After the lapse of five hours the gases, by cooling, will have so far lost their tension, and by unavoidable escape become so thin, as that, by placing a pocket-handkerchief over the mouth and nose, a person may, without danger, enter the room to open the windows. After the further lapse of half an hour the gases yet remaining may be neutralized by pouring fluid ammonia over the floor in different places. The evaporation of the ammonia will neutralize the acid gases, forming salts, which will escape out of the open windows. After the lapse of another hour at the furthest, no trace of the remedies employed will be perceived.

We claim as our invention—

The method herein described of destroying insects and vermin by the combustion, within a closed apartment, of a compound of sulphur, niter, and iodine, in a metallic vessel coated with indigo, substantially as set forth.

In testimony whereof we have signed our names to this specification in the presence of two subscribing witnesses.

SIMON LOESER.
ISIDOR LOESER.

Witnesses:
NIKOLAUS HÄNSEL,
JOSEPH SCHWAB.